United States Patent [19]

McCartney, Jr.

[11] Patent Number: 4,547,236

[45] Date of Patent: Oct. 15, 1985

[54] EXTRUDED COMPARTMENTALIZED CONTAINER

[75] Inventor: Charles P. McCartney, Jr., Yorktown, Ind.

[73] Assignee: General Motors Corporation, Detroit, Mich.

[21] Appl. No.: 385,495

[22] Filed: Jun. 7, 1982

[51] Int. Cl.⁴ .................. B29C 27/00; B29C 19/00; B65B 7/00; B32B 31/16
[52] U.S. Cl. .................... 156/69; 156/73.1; 156/244.13; 156/244.15; 156/244.18; 156/244.22; 156/244.24; 156/303.1; 156/293; 264/177 R; 429/176
[58] Field of Search ............... 429/176, 163, 177, 179; 156/244.11, 244.13, 244.22, 59, 73.1, 242, 213, 303.1, 244.24, 244.18, 244.19; 264/177 R

[56] References Cited

U.S. PATENT DOCUMENTS

| 1,847,214 | 3/1932 | Hebbeler | 429/177 |
| 3,449,170 | 6/1969 | Thornblad et al. | 429/163 |
| 3,600,232 | 8/1971 | Daguenet | 429/163 |
| 3,705,380 | 12/1972 | Roberts | 156/73.1 |
| 4,383,812 | 5/1983 | Calcagni | 156/244.13 |

FOREIGN PATENT DOCUMENTS 1378655 12/1974 United Kingdom .

Primary Examiner—Edward Kimlin
Assistant Examiner—Merrell C. Cashion
Attorney, Agent, or Firm—Lawrence B. Plant

[57] ABSTRACT

A multi-cell battery container and method of making same wherein a tubular extrusion having opposing ridged and grooved walls is cut to length and divided into a plurality of compartments by partitions subsequently sealingly mated with the grooves.

3 Claims, 6 Drawing Figures

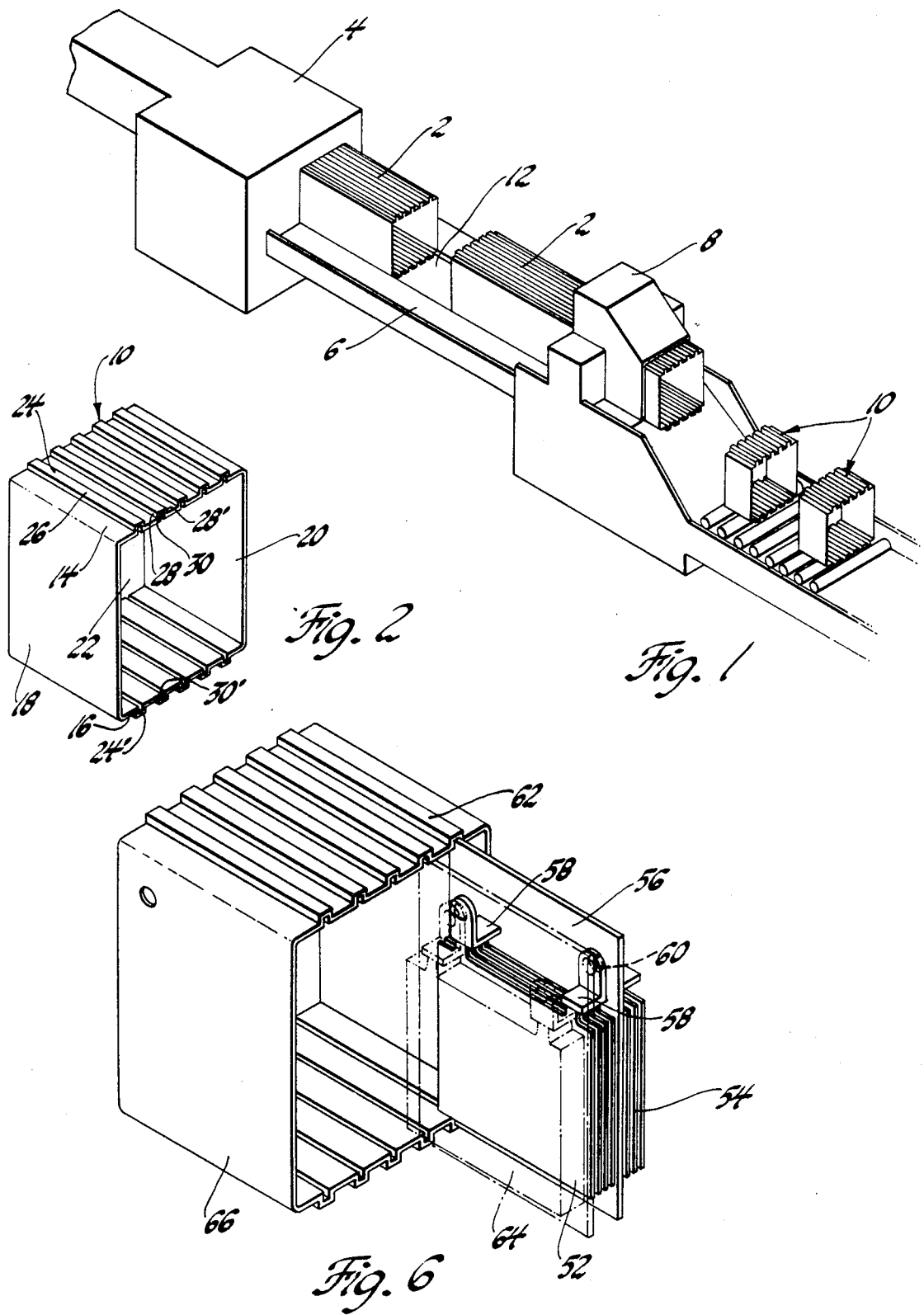

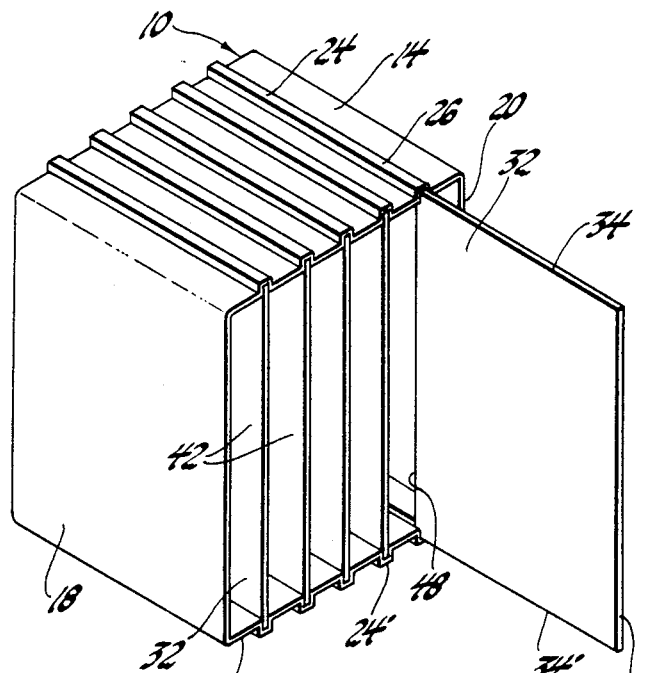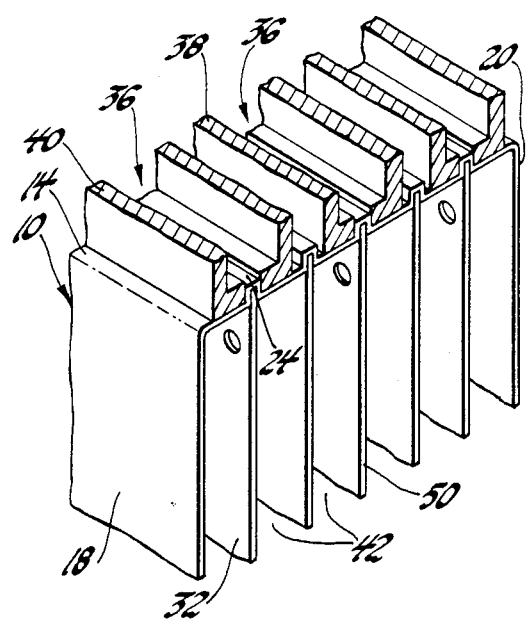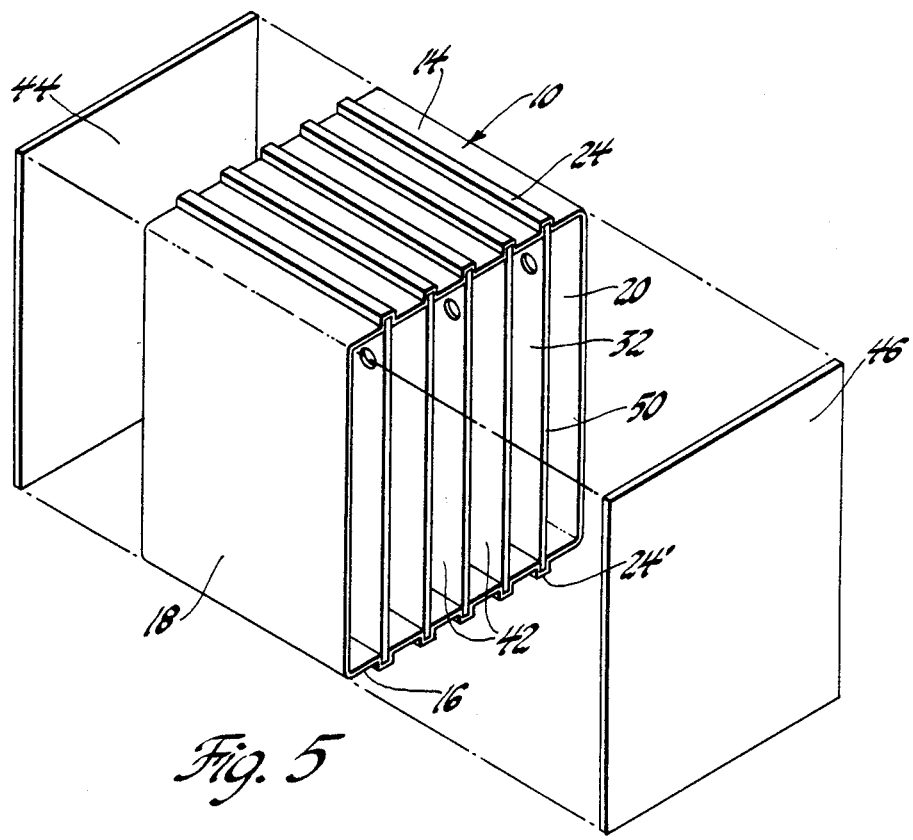

EXTRUDED COMPARTMENTALIZED CONTAINER

This file relates to compartmentalized containers and to a method of making same. While the invention is described and illustrated in the context of a multi-cell electric storage battery container, it is to be understood that the design and construction principals are applicable to a variety of compartmentalized containers.

BACKGROUND OF THE INVENTION

Compartmentalized containers, such as multi-cell battery cases, typically have the outer shell injection molded integrally with the intercell partitions. Injection molding typically requires a separate and expensive mold for each container size and involves considerable lost production time when changing molds from one battery model to the next. After molding the containers, the intercell partitions are then perforated for receiving the intercell connectors which join the several individual cell elements (i.e., stack of alternately interleaved positive and negative polarity plates and interjacent microporous separators) within the battery. Finally, the cell elements are inserted into the narrow cell compartments and each coupled to the cell elements in adjacent compartments through the aperture in the partition as by a technique such as disclosed in Matter et al. 3,947,290 or other known techniques. The capacity of the battery will vary according to the size of the cell elements therein and accordingly with the volumetric capacity of the container housing those elements.

British patent No. 1,378,655 discloses coextruding hinged intercell partitions and container shell walls to provide a collapsed but expandable multi-cell battery container. Such partition-shell coextrusion techniques require complex extrusion dies and closely controlled extrusion conditions to preclude warpage of the partitions. Moreover, once formed, conventional battery assembly techniques are still required to insert the elements and complete the intercell connections.

It is an object of the present invention to provide a unique, compartmentalized container, particularly suited to use with multi-cell electric storage batteries, and to a method of making such containers in a variety of sizes from a single simple molding die. It is a further object of the present invention to provide a battery container adapted to assembling the battery in a unique manner involving placement and interconnecting of the cell elements prior to their insertion into the container and in such a manner as to insure complete sealability of the partitions therein to prevent electrolyte migration between adjacent compartments. These and other objects and advantages of the present invention will become more readily apparent from the detailed description thereof which follows.

BRIEF DESCRIPTION OF THE INVENTION

The invention contemplates a unique compartmentalized container, process for making same and process for assemblying a multi-cell battery therefrom. A thermoplastic tube of indefinite length and rectangular cross-section is extruded and cut into short segments commensurate with the volumetric capacity sought for the container. Containers of various capacities may be made from the same length of tube by merely changing the length of the segments cut therefrom. The tube segment forms the shell of the finished container and comprises two edge-joined pairs of oppositely facing walls which together define a parallelepipedial central cavity. The opposing walls of one of the pairs each has channel-like, external ridges rooted at the wall and running the length thereof. Each ridge includes an inwardly-facing groove adapted to receive and be fused to the borders of discrete partition-forming plates inserted and welded therein. The discrete plates are preferably formed by cutting-off appropriate lengths (i.e., matched to the length of the shell segment) from an indefinite length of extruded plastic strip. The plates have sealing border portions along opposite edges thereof which mate with, and are welded in sealing engagement to, the grooves in the ridges by means of ultrasonic welding heads positioned along the outside of the ridges' sidewalls. An appropriate cover member(s) is (are) welded (e.g., heat-sealed) to the shell to complete the container.

Containers made in accordance with the present invention are particularly useful in the assembly of multi-cell electric storage batteries by a process wherein the plate is perforated and cell elements joined therethrough while separated from the shell and thereafter mating and sealing the partition plates to the shell.

DETAILED DESCRIPTION OF THE INVENTION

The invention may be better understood when considered in the light of the following detailed description thereof which is given in the context of one specific embodiment described hereafter in conjunction with the several figures in which:

FIG. 1 is an isometric illustration of the shell-forming steps of the present invention;

FIG. 2 is an isometric view of a container shell segment;

FIG. 3 is an isometric view of a container shell and partitions integrated therewith;

FIG. 4 is an isometric illustration of the welding step for joining the partitions to the shell;

FIG. 5 is an exploded isometric view of a compartmentalized shell and covers therefor; and FIG. 6 is an isometric illustration of a method of assemblying a multi-cell battery.

As best shown in FIG. 1, indefinite lengths of rectangular tubular stock 2 are extruded from an extruder 4 and carried, via conveyor 6, to cut-off device 8. The cut-off device 8 slices, saws or otherwise separates the tubular stock 2 into individual segments 10 of predetermined length depending on the capacity sought for the finished container. The lengths of the segments 10 may easily be varied by merely adjusting the distance that conveyor 6 indexes the stock 2 through the cutter 8. A gap 12 may be provided between the several lengths of stock 2 to permit substantially continuous extrusion of tube lengths 2 while the previously extruded length indexes through the cutter 8. Under these circumstances the gap 12 will slowly close as the extruding stock 2 advances toward the stock 2 which experiences periodic delays as traverses the cutter 8.

Each segment 10 forms the shell of a finished container and includes a first pair of opposing walls 14 and 16 integral with, and perpendicular to, a second pair of opposing walls 18 and 20. These several walls are joined along their edges to define a parallelepipedial internal cavity 22. The opposing walls 14 and 16 of the first pair each include at least one longitudinally extending ridge 24. Additional ridges may be used and will depend on the number of compartments sought for the particular container. The ridge 24 runs the full length of the segment 10 in the direction of extrusion and comprises two sidewalls 28 and 28' flanking a distal wall 26 opposite from where the ridge 24 is rooted at the wall 14 or 16. The distal wall 26 and sidewalls 28-28' together define a longitudinal groove 30 coextensive with the ridge 24. The groove 30 in one wall 14 of the first pair lies directly opposite and parallel to, a similar groove 30' in the opposite wall 16 of the same pair and are both adapted to receive the borders of a partition-forming plate 32 subsequently inserted therein (see FIG. 3).

The plates 32 each have sealable borders 34 and 34' at opposite edges thereof which, after mating with the grooves 30, are fused to the ridges 24-24' in the manner depicted in FIG. 4. In this regard, the sidewalls 28-28' of the ridges 24 are squeezed between the anvil 38 and vibratory energy imparting horn 40 of an ultrasonic welding fixture 36. High frequency mechanical vibrations (e.g., 20,000 hertz) generated by the horn 40 welds the sealable borders 34-34' of the plates 32 to the inside of the ridges 24 throughout the full length thereof and such as to provide a liquid-tight seal between the adjacent compartments 42 and thereby prevent electrolyte migration and associated ionic transport therebetween.

Following welding of the partitions 32 to the shell segments 10, appropriate cover(s) 44 and/or 46 (see FIG. 5) are joined to the shell wall edges 14, 16, 18 and 20 and plate edges 48 and 50 to provide a liquid-tight joint therebetween. This is most conveniently accomplished by locally heating the cover and corresponding edges of the walls and plates and then pressing them together while they are still soft in accordance with conventional heat-sealing techniques.

FIG. 6 depicts a method assemblying a multi-cell electric storage battery. In this regard, the intercell connector apertures 60 are punched and cell elements 52 and 54 (i.e., on opposite sides of partition 56) are joined one to the other via plate straps 58 before the plate 56 is mated and welded to the ridge 62. Performing these operations outside the shell can simplify these assembly operations and the production apparatus required therefor. While only two cell elements are shown concretely in FIG. 6, all of the cell elements and partitions would be so assembled outside the shell 66 (i.e., see phantom element 64) and the stack so formed then integrated into the shell 66. Thereafter appropriate final covers (not shown) are provided.

While this invention has been disclosed in terms of specific embodiments thereof it is not intended to be limited thereto but rather only to the extent set forth hereafter in the claims which follow.

The embodiments of the invention in which an exclusive property or privilege is claimed are defined as follows.

1. A method of making a container having a plurality of compartments comprising the steps of:
   extruding a thermoplastic material into a substantially continuous length of tubular stock including first and second pairs of opposing walls defining a parallelepipedial central cavity;
   channel-like external ridges rooted on, and projecting outwardly of, each of said first pair of cavity-defining walls, said ridges extending the length of said stock parallel to said second pair of walls and each ridge comprising two opposed sidewalls adjoining an end wall outboard the cavity-defining wall for defining an internal groove coextensive with said ridge, the grooves in said opposing walls being parallel and opposite each other and adapted to receive a partition-forming plate therein;
   transversely cutting said stock into open-ended segments of predetermined length commensurate with the volumetric capacity sought for the container;
   forming a thermoplastic plate having a length substantially equal to said predetermined length, a width substantially equal to the distance between said end walls of opposing grooves, and sealable borders along the lengthwise edges of said plate;
   inserting said borders into opposing grooves such that said plate lies transverse said cavity parallel to said second pair of walls and divides said cavity into adjacent compartments;
   welding said borders to the inside of said ridges so as to permanently secure said plate to said first pair of walls and provide a liquid-tight seal between said adjacent compartments; and
   securing a cover to at least one of said open ends in liquid-tight relation to said plate and said first and second pairs of walls.

2. A method of making a container having a plurality of compartments comprising the steps of:
   extruding a thermoplastic material into a substantially continuous length of tubular stock including first and second pairs of opposing walls defining a parallelepipedial central cavity;
   channel-like external ridges rooted on, and projecting outwardly of, each of said first pair of cavity-forming walls, said ridges extending the length of said stock parallel to said second pair of walls and each ridge comprising two opposed sidewalls adjoining an end wall outboard the cavity-defining wall for defining an internal groove coextensive with said ridge, the grooves in said opposing walls being parallel and opposite each other and adapted to receive a partition-forming plate therein;
   transversely cutting said stock into open-ended segments of predetermined length commensurate with the volumetric capacity sought for the container;
   forming a thermoplastic plate having a length substantially equal to said predetermined length, a width substantially equal to the distance between said end walls of opposing grooves, and sealable borders along the lengthwise edges of said plate;
   inserting said borders into opposing grooves such that said plate lies transverse said cavity parallel to said second pair of walls and divides said cavity into adjacent compartments;
   positioning a vibratory welding tool contiguous said sidewalls along the length thereof and subjecting each said ridge to high frequency mechanical vibrations of sufficient intensity to fuse said border to said sidewalls along the full length of said groove; and
   securing a cover to at least one of said open ends in liquid-tight relation to said plate and said first and second pairs of walls.

3. A method of making a multi-cell battery comprising the steps of:
   extruding a thermoplastic material into a substantially continuous length of tubular stock including first and second pairs of opposing walls defining a parallelepipedial central cavity;
   channel-like external ridges rooted on, and projecting outwardly of, each of said first pair of cavity-defining walls, said ridges extending the length of said stock parallel to said second pair of walls and each ridge comprising two opposed sidewalls adjoining an end wall outboard the cavity-defining wall for defining an internal groove coextensive with said ridge, the grooves in said opposing walls being parallel and opposite each other and adapted to receive a partition therein;

transversely cutting said stock into open-ended segments of predetermined length commensurate with the energy capacity sought for the battery;

forming a thermoplastic plate having a length substantially equal to said predetermined length, a width substantially equal to the distance between said end walls of opposing grooves, and sealable borders along the lengthwise edges of said plate;

forming an aperture through said plate;

assembling a plurality of galvanic cell elements each comprising a stack of alternately interleafed positive and negative polarity plates and interjacent microporous separators;

joining a first said cell element on one side of said plate to a second said cell element on the opposite side of said plate and through said aperture such as to secure said joined elements in liquid-tight relation to said plate;

inserting the borders of said plate into opposing grooves such that said plate lies transverse said cavity parallel to said second pair of walls and divides said cavity into separate cells each containing its own galvanic cell element;

positioning each said ridge between the horn and anvil portions of a vibratory welding tool and subjecting each said ridge to high frequency mechanical vibrations of sufficient intensity to fuse said borders and ridges together along the full lengths thereof so as to permanently secure said plate to said first pair of walls within said groove and provide a liquid-tight seal between adjacent cells of the battery; and securing a cover to said open ends in liquid-tight relation to said plate and said first and second pairs of walls.

* * * * *